US008143187B2

(12) United States Patent
Hoang et al.

(10) Patent No.: US 8,143,187 B2
(45) Date of Patent: Mar. 27, 2012

(54) CATALYTIC SYSTEMS AND PROCESS FOR TREATMENT OF INDUSTRIAL PROCESS AND WASTE STREAMS

(75) Inventors: Manh Hoang, South Clayton (AU); Kingsley Opoku-Gyamfi, Quakers Hill (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 1282 days.

(21) Appl. No.: 10/491,650

(22) PCT Filed: Oct. 3, 2002

(86) PCT No.: PCT/AU02/01356
§ 371 (c)(1),
(2), (4) Date: Oct. 4, 2004

(87) PCT Pub. No.: WO03/028887
PCT Pub. Date: Apr. 10, 2003

(65) Prior Publication Data
US 2005/0035068 A1    Feb. 17, 2005

(30) Foreign Application Priority Data
Oct. 3, 2001 (AU) .................................. PR 8062

(51) Int. Cl.
*B01J 23/00* (2006.01)
*B01J 21/00* (2006.01)
*B01J 29/00* (2006.01)
*B01J 20/00* (2006.01)
*B01J 37/00* (2006.01)

(52) U.S. Cl. ........ 502/300; 502/240; 502/241; 502/243; 502/244; 502/247; 502/248; 502/250; 502/253; 502/256; 502/257; 502/258; 502/259; 502/260; 502/261; 502/262; 502/263; 502/302; 502/305; 502/306; 502/323; 502/324; 502/327; 502/329; 502/332; 502/333; 502/334; 502/335; 502/336; 502/337; 502/339; 502/355; 502/415

(58) Field of Classification Search ............... 502/300, 502/324, 327, 329, 309, 332–339, 355, 415, 502/439, 240, 241, 243–245, 247–248, 250, 502/253, 256–263, 302, 305–307, 312–320, 502/323
See application file for complete search history.

(56) References Cited

U.S. PATENT DOCUMENTS

| | | | | |
|---|---|---|---|---|
| 3,235,515 A * | 2/1966 | Taylor | ............................ | 502/337 |
| 3,794,598 A * | 2/1974 | Schlaffer | ........................ | 502/74 |
| 3,950,368 A | 4/1976 | Broecker et al. | | |
| 3,990,866 A | 11/1976 | Broecker et al. | | |
| 4,053,579 A * | 10/1977 | Kato et al. | ..................... | 423/630 |
| 4,089,810 A * | 5/1978 | Diwell et al. | .................. | 502/302 |
| 4,105,590 A * | 8/1978 | Koberstein et al. | ............ | 502/151 |
| 4,185,967 A | 1/1980 | Komodromos et al. | | |
| 4,268,399 A | 5/1981 | Box, Jr. et al. | | |
| 5,034,367 A * | 7/1991 | Falke et al. | .................... | 502/159 |
| 5,051,393 A * | 9/1991 | Harrison et al. | .............. | 502/304 |
| 5,286,687 A * | 2/1994 | Murase et al. | ................. | 501/128 |
| 5,811,362 A | 9/1998 | Da Silva et al. | | |
| 5,851,948 A * | 12/1998 | Chuang et al. | ................ | 502/314 |
| 6,013,599 A * | 1/2000 | Manson | ........................ | 502/340 |
| 6,319,876 B1 * | 11/2001 | Maier | ........................... | 502/178 |
| 6,326,329 B1 * | 12/2001 | Nunan | ........................... | 502/242 |
| 6,548,445 B1 * | 4/2003 | Buysch et al. | ................. | 502/230 |

FOREIGN PATENT DOCUMENTS

| | | |
|---|---|---|
| EP | 0 431 932 B1 | 7/1994 |
| GB | 1342020 | 12/1973 |
| GB | 1342020 A | 12/1973 |

OTHER PUBLICATIONS

Sheng H. Lin and Shin J. Ho, "Kinetics of Wet Air Oxidation of High-Strength Industrial Wastewater," Journal of Enviromental Engineering, Sep. 1997, pp. 852-858.

Gabriele Centi, et al., "Catalytic wet oxidation with $H_2O_2$ of carboxylic acids on homogenous and heterogeneous Fenton-type catalysts," Catalysis Today, 2000, pp. 61-69, vol. 55, Elsevier Science B.V.

Qinglin Zhang and Karl T. Chuang, "Alumina-Supported Noble Metal Catalysts for Destructive Oxidation of Organic Pollutants in Effluent from a Softwood Kraft Pulp Mill,"Ind. Eng. Chem. Res., 1998, pp. 3343-3349, vol. 37, American Chemical Society.

L. Lei, "Catalytic Wet Air Oxidation of Dyeing and Printing Wastewater," Wat. Sci. Tech., 1997, pp. 311-319, vol. 35, No. 4, Elsevier Science Ltd.

H. Gulyas, "Treatment of Industrial wastewaters With Ozone/Hydrogen Peroxide," Wat. Sci. Tech., 1995, pp. 127-134, vol. 32, No. 7, IAWQ.

* cited by examiner

*Primary Examiner* — Cam N. Nguyen
(74) *Attorney, Agent, or Firm* — McDermott Will & Emery LLP

(57) ABSTRACT

A process for preparing supported catalyst in pellet or coated monolith form is disclosed the method includes the steps of: forming a mixed metal carbonate complex having at least two metals by subjecting a first metal carbonate containing compound to ion exchange with desired metal cations; heat treating the resulting mixed metal carbonate complex to form a mixed oxide which consists of active metal oxides supported on a catalyst support; forming the resulting supported catalysts into pellets or coating the resulting supported catalyst onto a monolithic support. The catalysts may be used for treating effluents containing organic material in the presence of an oxidising agent.

17 Claims, No Drawings

CATALYTIC SYSTEMS AND PROCESS FOR TREATMENT OF INDUSTRIAL PROCESS AND WASTE STREAMS

FIELD OF INVENTION

This invention relates to catalytic systems and a catalytic process for wet oxidation of organic-containing industrial process and waste streams.

BACKGROUND OF INVENTION

The removal of organic substances from process and waste streams poses a significant challenge for many industries. This challenge has further been compounded by the increasing rigorous quality control restrictions imposed on manufacturing industries. Depending on the nature of the industry, organic substances in industrial process and waste streams can be a complex mixture of different compounds ranging from simple low molecular weight hydrocarbons such as alcohols, aldehydes, ketones, carboxylic acids, low molecular weight fatty acids to high molecular weight hydrocarbons such as fulvic and humic acids. Organic substances in industrial waste effluents may contain nitrogen, chloride, and sulfur and some effluents contain process chemicals which need to be recycled, e.g. black liquor from Bayer process and pulp mill.

Conventional methods for the treatment of organic-containing industrial effluents include biological and physical treatments, incineration and wet air oxidation. Biological treatment is the most widely used method due to its simplicity and low cost. However, the microorganisms used for this process are effective for only low organic content wastes. Thus for high organic content wastes, methods such as wet air oxidation become very attractive.

It is known from the prior art that wet air oxidation is a process in which organic substances in aqueous streams are oxidised by an oxidant. Depending on reaction conditions and the type of organic compound to be oxidised, both non-catalytic and catalytic wet oxidation can be used to convert organic substances into $CO_2$ and biodegradable low molecular substances, such as mono or dicarboxylic acids.

Non catalytic wet air oxidation is a well-established technique for waste water treatment (Swed. Pat. 34941,1911). It entails the liquid phase oxidation of organics and oxidisable inorganics at elevated temperatures (up to 320° C.) and pressures (up to 20 MPa) using a gaseous source of oxygen. The extreme conditions employed often result in severe technical difficulties as well as increased capital cost.

Catalytic wet oxidation is a promising alternative technique, which can operate at lower temperatures and pressures. Catalytic wet oxidation can be carried out by means of homogeneous or heterogeneous catalysis. There are a number of homogeneous catalytic systems reported which effectively oxidise organic substances from aqueous streams. Examples of such catalytic systems are $CuSO_4$ and $Cu(NO_3)_2$. (Lei et al., Wat. Sci. Tech., Vol. 35, No. 4, 1997, pp 311-319; Lin and Ho, J. Environ. Eng., September, 1997, pp 852-858). However, the need for down stream processing to remove the spent catalyst is a distinct disadvantage making homogeneous technology commercially infeasible.

Heterogeneous catalysis appears to be a better alternative. In heterogeneous oxidation catalysis, the catalytic activity is attributable to surface oxygen available on the solid catalyst. A good catalyst is characterised by high surface oxygen availability and fast oxygen transfer ability. Depending on the application, the catalyst may be in the form of a powder, pellets or a monolith.

Traditionally, catalytic wet air oxidation is carried out in slurry or trickle bed reactors. In slurry reactors, the catalyst has to be recycled continuously to the reactor. Unfortunately, separation of the fine catalyst particles can be troublesome, costly and time-consuming. To overcome this, a trickle bed reactor with catalyst in the form of pellets or monoliths may be used. Catalysts in the form of pellets are well known as are techniques for forming such pellets. In the monolithic system, catalytic materials are deposited onto the monolith support in the form of a very thin layer. The monolith support can be in the form of honeycombs with parallel open channels. Reactants may flow through the monolithic channels. In this reactor configuration, the need to filter and recycle catalyst back to the reactor is eliminated.

Industrial interest has stimulated numerous investigations into catalysts for wet oxidation of organic substances from process and waste streams. Although a number of catalytic systems have been reported in the open and patent literatures, most of the catalytic systems require severe conditions, namely high pressures and high temperatures, in order to achieve significant oxidation rate (U.S. Pat. No. 4,268,399-A; Eur. Pat. 90313238.9; Lin and Ho, J. Environ. Eng., September, 1997, pp 852-858; Zhang and Chuang, Ind. Eng. Chem. Res., 37, 1998, pp 3343-3349). In some catalytic systems, strong oxidants such as ozone and $H_2O_2$ are required (Centi et al., Catal. Today, 55, 2000, pp 61-69; Gulyas et al., Wat. Sci. Tech., Vol 32, No 7, 1995, pp 127-134).

Accordingly, it is an object of the present invention to overcome, or at least alleviate, the difficulties presented by prior art.

SUMMARY OF INVENTION

In a first aspect, the present invention provides a process for preparing a supported catalyst in pellet form or coated monolith form which process includes:

forming a mixed metal carbonate complex having at least two metals by subjecting a first metal carbonate containing compound to ion exchange with desired metal cations;

heat treating the resulting mixed metal carbonate complex to form a mixed oxide which consists of active metal oxides supported on a catalyst support;

forming the resulting supported catalysts into pellets or coating the resulting supported catalyst onto a monolithic support.

Preferably the first metal carbonate containing compound is ammonium dawsonite $NH_4Al(OH)_2CO_3$ and this includes hydrates of such compounds. However, other metal carbonates, including sodium dawsonite, $NaAl(OH)_2CO_3$ may also be used.

Active metal oxides are preferably selected from Co, Mn, Cu, Ni, Pt, Zn, Fe, Cr, V, Ru, Rh, Pd, Pt, Ag and Ce. More preferred metal oxides are reducible metals selected from the transition metal groups. Preferably they are present in the range of 0.5 to 20 wt % of the supported catalyst.

The active metal oxides may be present in any oxidation state. They may be chemically bound to the support surface or may be present as separate crystalline phases.

The supported catalyst may contain one or more additional components, which alter its activity and selectivity. These additional components may be selected metals of the groups IA and IIA, lanthanides, sulphides and mixtures thereof.

The ammonium dawsonite may be prepared by reacting a solution containing a soluble salt of aluminium such as the sulfate or nitrate with a solution of ammonium bicarbonate with or without aqueous ammonia. However, the metal carbonate may be obtained from natural as well as other synthetic routes.

The monolithic support may be obtained commercially or may be fabricated from any material such as cordierite (magnesium aluminium silicate), alumina, silica-alumina, red mud, or the like.

The present invention also provides a process for preparing a supported metal catalyst precursor by exchanging at least two different reducible metal ions with a metal carbonate-containing compound such as a dawsonite or a dawsonite like compounds, for example $NH_4Al(OH)_2CO_3$.

The metal carbonate containing compound may be obtained from any suitable sources, such as a mineral ore or a synthetic compound. In this aspect, the metal carbonate containing compound functions as a catalyst support precursor. Subsequent heat treatment decomposes the system into the supported catalyst.

The invention also provides a method of preparing catalysts comprising the steps of:
  preparing ammonium dawsonite
  adding solutions containing ions of at least one catalytically active component selected from the group consisting of Co, Mn, Cu, Ni, Pt, Zn, Fe, Cr, V, Ru, Ag and Ce to the ammonium dawsonite.
  allowing ion exchange to take place
  separating the solid from the solution
  washing and drying the solid
  heating the solid to a temperature high enough to form supported catalysts.

The invention also provides a method of producing supported monolithic catalysts comprising the steps of:
  forming a slurry of the catalyst and wash-coating it on the monolithic support
  drying the wash-coated monolithic support
  heating the wash-coated monolithic support to a temperature high enough to activate it.

Supported monolithic catalysts may also be produced by wash-coating a metal carbonate complex such as ammonium dawsonite, $NH_4Al(OH)_2CO_3$, onto the monolith support followed by an ion exchange step with desired cations. This process may comprise of the following steps:
  forming a mixed metal carbonate complex
  forming a slurry of the mixed metal carbonate and wash-coating it on the monolith support
  exchanging with desired cations
  drying the wash-coated monolith
  heating the wash-coated monolith to a temperature high enough to activate the catalyst According to a further aspect of the invention, there is provided a process for the treatment of effluents obtained from industries such as pulp and paper, textile etc. This involves contacting the effluent with the catalyst of the present invention in the presence of an oxidising agent.

DETAILED DESCRIPTION OF THE INVENTION

The present invention will now be further described by reference to preferred embodiments described in the following examples. It must however be noted that, the details thereof do not represent a limitation of the invention.

EXAMPLE 1

This example describes the preparation of an ammonium dawsonite support.

A 360 ml solution containing 22 g $Al_2SO_4.18H_2O$ was added drop-wise to a 180 ml alkaline solution containing 20 g $NH_4HCO_3$ and 31.6 g aqueous $NH_3$ (25%) while stirring was in progress. The resulting precipitate was aged for 15 hours, washed with water and dried in air. This material had the composition $NH_4Al(OH)_2CO_3$ with 36% $Al_2O_3$ on calcination and was designated SUPPORT I.

EXAMPLE 2

This example describes the preparation of an ammonium dawsonite support.

A 300 ml solution containing 23.9 g $Al_2SO_4.18H_2O$ was added drop-wise to a 150 ml alkaline solution containing 22.7 g $NH_4HCO_3$ while stirring was in progress. The resulting precipitate was washed with water and dried in air. This material had the composition $NH_4Al(OH)_2CO_3$ which also gave 36% $Al_2O_3$ on calcination and was designated SUPPORT II.

EXAMPLE 3

This example describes the preparation of a catalyst having 0.4 wt % $Fe_2O_3$, 0.9 wt % CuO and 7.9 wt % $Co_2O_3$ supported on alumina.

A 20 ml solution containing 1.78 g $Co(NO_3)_2.6H_2O$, 0.18 g $Cu(NO_3)_2.3H_2O$ and 0.15 g $Fe(NO_3)_3.9H_2O$ was added drop-wise to a 60 ml slurry containing 16 g of SUPPORT I (36 wt. % $Al_2O_3$) from Example 1 while stirring was in progress. After adding the above solution, stirring was continued for about 4 hours. The solid was then separated by centrifugation, washed with water, dried in air overnight and calcined at 300° C. for 4 hours to give the desired catalyst composition.

EXAMPLE 4

This example describes the preparation of a catalyst having 4.9 wt % $Fe_2O_3$, 4.5 wt % $Mn_2O_3$ and 3.3 wt % CaO supported on alumina.

A 20 ml solution containing 0.9 g $Fe(NO_3)_3.9H_2O$, 0.34 g $Ca(NO_3)_2$, and 0.36 g $Mn(NO_3)_2$ was added drop-wise to a 40 ml slurry containing 8.6 g of the ammonium dawsonite SUPPORT II (36 wt. % $Al_2O_3$) from Example 2 while stirring was in progress. After adding the solution, stirring was continued for 4 hours. The solid was then separated by filtration, washed with water, dried in air overnight and calcined at 400° C. for 4 hours to give the desired catalyst composition.

EXAMPLE 5

This example describes the preparation of a catalyst having 2.5 wt % $Co_2O_3$, 7.4 wt % $Mn_2O_3$ and 2.2 wt % BaO supported on alumina.

A 20 ml solution containing 0.32 g $Co(NO_3)_2.6H_2O$, 0.6 g $Mn(NO_3)_2$ and 0.136 g $Ba(NO_3)_2$ was added drop-wise to a 40 ml slurry containing 8.6 g of the ammonium dawsonite SUPPORT I (36 wt % $Al_2O_3$) prepared in example 1. After about 4 hours of stirring, the solid was separated by centrifugation, washed with water, dried in air overnight and calcined at 300° C. for 4 hours to give the desired catalyst composition.

EXAMPLE 6

This example describes the preparation of a catalyst having 6.7 wt % $Co_2O_3$ and 3.7 wt % $Mn_2O_3$ supported on alumina.

A 10 ml solution containing 0.16 g $Mn(NO_3)_2$ and 0.43 g $Co(NO_3)_2.6H_2O$ was added drop-wise to a 20 ml slurry containing 4.60 g of the ammonium dawsonite SUPPORT II (36 wt % $Al_2O_3$) prepared in Example 2 while stirring was in progress. After about 4 hours of stirring, the solid was separated by centrifugation, washed with water. The solid was separated by centrifugation, dried in air overnight and calcined at 250° C. for 4 hours to give the desired catalyst composition. The catalyst had a surface area of 170 m2/g.

EXAMPLE 7

This example describes the preparation of a catalyst having 9 wt % CuO supported on alumina.

The procedure of Example 5 was followed, except that a 20 ml solution containing 0.91 g $Cu(NO_3)_2.3H_2O$ was used to give the desired catalyst composition.

EXAMPLE 8

This example describes the preparation of a catalyst having 7.2 wt % $Co_2O_3$ and 1.8 wt % $Cr_2O_3$ supported on alumina.

The procedure of Example 5 was followed, except that a 20 ml solution containing 0.84 g $Co(NO_3)_2$ and 0.32 g $Cr(NO_3)_2.9H_2O$ was used.

EXAMPLE 9

This example describes the preparation of a catalyst having 6.6 wt % $CO_2O_3$, 2.5 wt % CuO, 1.2 wt % $CeO_2$ and 0.2 wt % $Ag_2O$ supported on cordierite monolith.

A 400 ml solution containing 1.34 g $AgNO_3$, 86.06 g $Co(NO_3)_2.6H_2O$, 28.18 g $Cu(NO_3)_2.3H_2O$ and 14.90 g $(NH_4)_2Ce(NO_3)_6$ was added drop-wise to a 1000 ml alkaline solution containing 70 g of $Na_2CO_3$ while stirring was in progress. The resulting precipitate was washed with water, dried in air overnight and calcined at 250° C. for 4 hours.

100 ml of $H_2O$ was added to 10 g of the mixed metal oxide prepared above and milled for about 20 minutes to obtain a smooth slurry. Commercially obtained cordierite monolith was cut into cylindrical blocks each having a diameter of 15 mm and height of 25 mm. These blocks were immersed (one at a time) in the mixed metal oxide slurry while stirring was in progress until all the channels were coated. The coated block was then dried in air overnight. The coating process was repeated 3 times. After the third coating, the monolith was dried in air overnight and calcined at 300° C. for 4 hours.

EXAMPLE 10

This example describes the preparation of a catalyst having 3.0 wt % $Co_2O_3$, 2.4 wt % CuO, 3.0% wt % $Fe_2O_3$, 1.2 wt % $CeO_2$, 0.4 wt % $Ag_2O$ supported on alumina.

A 90 ml solution containing 2.17 g $Co(NO_3)_2.6H_2O$, 1.46 g $Cu(NO_3)_2.3H_2O$, 3.13 g $Fe(NO_3)_3.9H_2O$, 0.76 g $(NH_4)_2Ce(NO_3)6$ and 0.13 g $AgNO_3$ was added dropwise to a 180 ml slurry containing 48.65 g of the ammonium dawsonite SUPPORT II (36 wt. % $Al_2O_3$) prepared in Example 2 while stirring was in progress. After about 2 hours of stirring, the solid was separated by centrifugation, washed with water, dried in air overnight and calcined at 300° C. for 4 hours to give the desired catalyst composition.

EXAMPLE 11

The method used in example 9 was followed except that the catalyst prepared in Example 10 was wash coated onto a commercial monolith.

EXAMPLE 12

This example describes the treatment of pulp and paper effluent using a catalyst according to the present invention.

1.4 g of catalyst prepared in accordance to Example 7 was added to 70 ml of effluent obtained from the pulp and paper industry. The catalyst and effluent were allowed to react in an autoclave at 90° C. for 2 hours in the presence of 800 kPa gaseous air. A reduction in colour of 86% was achieved.

EXAMPLE 13

This example describes the treatment of pulp and paper effluent using a catalyst according to the present invention.

2 g of catalyst prepared in accordance to example 6 was added to 100 ml of effluent obtained from the pulp and paper industry. The catalyst and effluent were allowed to react in an autoclave at 70° C. for 2 hours in the presence of 800 kPa gaseous air. A reduction in colour of 87% was achieved.

EXAMPLE 14

This example describes the treatment of pulp and paper effluent using a catalyst according to the present invention.

2 g of catalyst prepared in accordance to example 6 was added to 100 ml of effluent obtained from the pulp and paper industry. The catalyst and effluent were allowed to react in an autoclave at 90° C. for 2 hours in the presence of 800 kPa gaseous air. A colour removal of 90% and COD reduction of 80% were achieved.

EXAMPLE 15

This example illustrates the fact that the catalyst may be reused and also regenerated.

The spent catalyst from Example 14 was recovered and added to 100 ml of fresh effluent obtained from the pulp and paper industry. The spent catalyst and fresh effluent were allowed to react under the same conditions used in example 14. This procedure was repeated 6 times. After 6 runs, the catalyst activity was decreased by 15%. Full catalyst activity can be restored by heating the spent catalyst in air at 300° C. for 4 h.

EXAMPLE 16

This example describes the treatment of textile effluent using a catalyst according to the present invention.

1 g of catalyst prepared in accordance to Example 8 was added to 100 ml of waste effluent obtained from the textile industry. The catalyst and effluent were allowed to react in an autoclave at 70° C. for 1 hour in the presence of 400 kPa gaseous air. A reduction in colour of 91% was achieved.

EXAMPLE 17

This example illustrates the treatment of textile effluent using a catalyst according to the present invention.

1.4 g of catalyst prepared in accordance to example 3 was added to 70 ml of waste effluent obtained from the textile industry. The catalyst and effluent were allowed to react in an autoclave at 90° C. for 4 hour in the presence of 800 kPa gaseous air. A reduction in COD of 86% was achieved.

EXAMPLE 18

This example illustrates the treatment of pulp and paper effluent using a catalyst according to the present invention.

A flow of effluent (1 ml/min) obtained from pulp and paper industry (COD=2500 ppm, colour=2000 HU) and a flow of air (20 ml/min) were allowed to react in an 80 ml tubular reactor packed with 12 blocks of the catalyst prepared in accordance to example 9. At a reactor temperature of 90° C., COD and colour reduction of 63% and 90% respectively were achieved.

EXAMPLE 19

This example illustrates the deodorisation of pulping process liquor using a catalyst according to the present invention.

80 ml of pulping process liquor was put in a glass bubbler, which was submerged in the water bath at 90° C. An air flow was bubbled through the liquor at a flow rate of 13 ml/min. The volatile components vaporised at 90° C. carried over with air was flowed over an 80 ml tubular reactor packed with 12 blocks of catalyst prepared in accordance to example 11. At a reactor temperature of 95° C., the following results were obtained.

| Substance treated | % removal (run time = 4 hours) |
|---|---|
| $H_2S$ | >99 |
| Methyl mercaptan | >99 |
| Ethyl mercaptan | >99 |
| Dimethyl sulfide | >99 |
| Dimethyl disulfide | >95 |
| Dimethyl trisulfide | >99 |

EXAMPLE 20

This example illustrates the treatment of petrochemical effluent using a catalyst according to the present invention.

1 ml/min of effluent obtained from the petrochemical industry (COD=1520 ppm) and 100 ml/min of air were allowed to react in an 80 ml reactor packed with 12 blocks of the catalyst prepared in accordance to example 9. At a reactor temperature of 90 C., a reduction in COD of 74% were achieved.

Since modification within the spirit and scope of the invention may be readily effected by persons skilled in the art, it is to be understood that the invention is not limited to the particular embodiment described, by way of example, hereinabove.

The invention claimed is:

1. A process for preparing a supported catalyst in pellet form or coated monolith form comprising the steps of:
   providing a catalyst support precursor consisting of a first metal carbonate containing compound;
   subjecting the catalyst support precursor to ion exchange with desired metal cations to form a mixed metal carbonate complex having at least two metals;
   heat treating the mixed metal carbonate complex to form a mixed oxide supported catalyst, the supported catalyst consisting of active metal oxides supported on a metal carbonate catalyst support; and
   forming the supported catalyst into pellets or coating the supported catalyst onto a monolithic support.

2. A process as defined in claim 1 wherein the first metal carbonate containing a compound is ammonium dawsonite, $NH_4Al(OH_2)CO_3$.

3. A process as defined in claim 1 or claim 2 wherein the desired metal cations are derived from the group of metals consisting of Co, Mn, Cu, Ni, Pt, Zn, Fe, Cr, V, Ru, Rh, Pd, Pt, Ag and Ce.

4. A process as defined in claim 3 wherein the metals are transition metals.

5. A process as defined in claim 1 or 2 wherein the active metal oxides are present in the range of 0.5 to 20 wt % of the supported catalyst.

6. A process as defined in claim 1 or 2 wherein the supported catalyst further contains at least one metal selected from the group consisting of metals of Groups IA, IIA and lanthanides.

7. A process as defined in claim 6 wherein the supported catalyst further contains at least one metal selected from the group consisting of metal of Groups IA, IIA and lanthanides.

8. A process as defined in claim 1 or 2 wherein the monolithic support is obtained commercially or may be fabricated from cordierite (magnesium aluminum silicate), alumina, silica-alumina, or red mud.

9. A process for preparing a supported metal catalyst precursor by exchanging at least two different reducible metal ions into or onto a metal carbonate-containing compound consisting of a dawsonite or a dawsonite like compound.

10. A method of preparing catalysts comprising the steps of:
    preparing ammonium dawsonite,
    adding solutions containing ions of at least one catalytically active component selected from the group consisting of Co, Mn, Cu, Ni, Pt, Zn, Fe, Cr, V, Ru, Ag and Ce to the ammonium dawsonite,
    allowing ion exchange to take place,
    separating the solid from the solution,
    washing and drying the solid, and
    heating the solid to a temperature sufficient to form supported catalysts.

11. A method of preparing supported monolithic catalysts comprising the steps of:
    providing a supported catalyst precursor consisting of a mixed metal carbonate complex having at least two metals;
    forming a slurry of the supported catalyst precursor;
    wash-coating the supported catalyst precursor onto a monolithic support;
    drying the wash-coated monolithic support; and
    heating the wash-coated monolithic support to a temperature sufficient to activate the supported monolithic catalyst.

12. A method of preparing supported monolithic catalysts comprising the steps of:
    providing a catalyst support precursor consisting of a first metal carbonate containing compound; forming a slurry of the catalyst support precursor;
    wash-coating the catalyst support precursor onto a monolithic support;
    subjecting the catalyst support precursor to ion exchange with desired metal cations to form a supported catalyst precursor consisting of a mixed metal carbonate complex having at least two metals;
    drying the wash-coated monolithic support; and
    heating the wash-coated monolithic support to a temperature sufficient to activate the mixed metal carbonate complex of the supported catalyst precursor to form a mixed oxide supported catalyst, the supported catalyst consisting of active metal oxides supported on an oxidized catalyst support.

13. A process for preparing a supported catalyst in pellet form or coated monolith form comprising the steps of:
- providing a catalyst support precursor consisting of ammonium dawsonite ($NH_4Al(OH_2)CO_3$);
- subjecting the ammonium dawsonite to ion exchange with desired metal cations to form a mixed metal carbonate complex having at least two metals;
- heat treating the mixed metal carbonate complex to form a mixed oxide supported catalyst, the supported catalyst consisting of active metal oxides supported on an ammonium dawsonite catalyst support; and
- forming the supported catalyst into pellets or coating the supported catalyst onto a monolithic support.

14. A process as defined in claim 13 wherein the desired metal cations are derived from the group of metals consisting of Co, Mn, Cu, Ni, Pt, Zn, Fe, Cr, V, Ru, Rh, Pd, Pt, Ag and Ce.

15. A process as defined in claim 14 wherein the metals are transition metals.

16. A process as defined in claim 13 wherein the active metal oxides are present in the range of 0.5 to 20 wt % of the supported catalyst.

17. A process as defined in claim 13 wherein the monolithic support is obtained commercially or is fabricated from cordierite (magnesium aluminum silicate), alumina, silica-alumina or red mud.

* * * * *